Feb. 26, 1946.  H. A. CRUVER  2,395,398
AMUSEMENT DEVICE
Filed Feb. 5, 1945  3 Sheets-Sheet 1
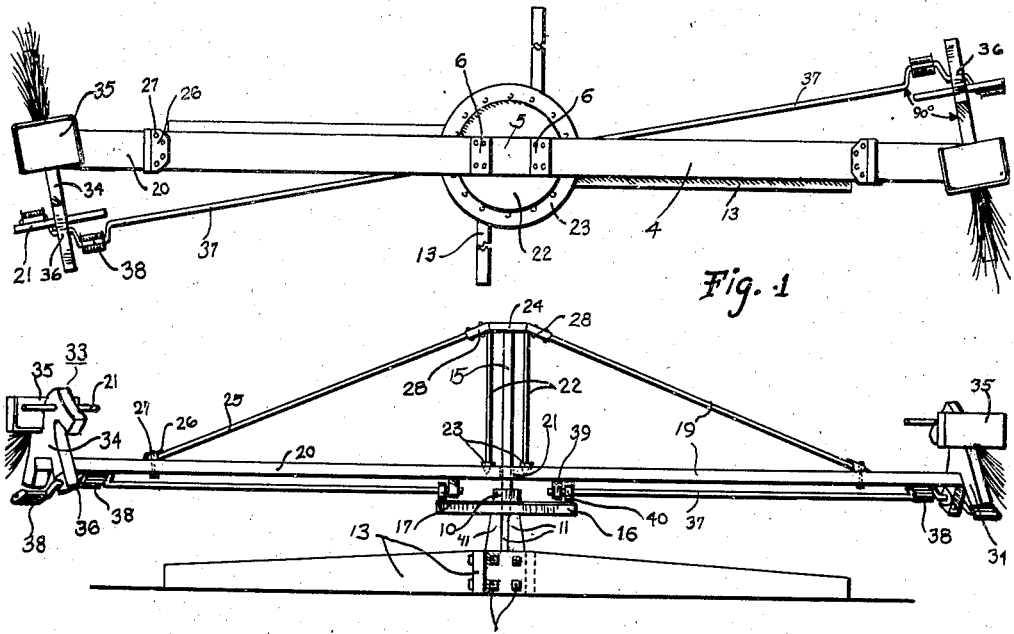
Fig. 1
Fig. 2
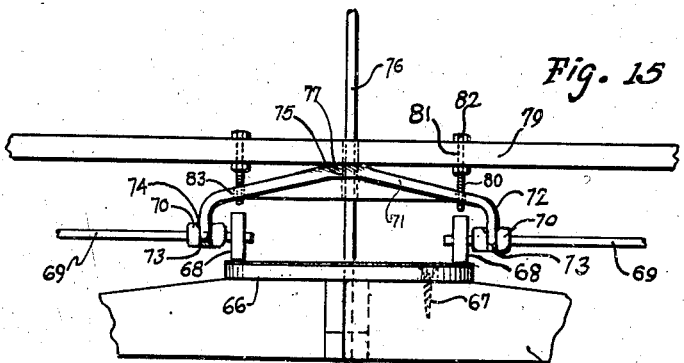
Fig. 15
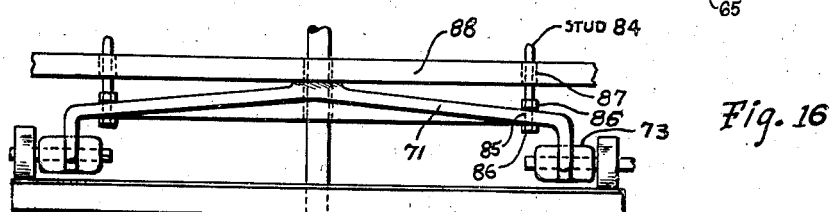
Fig. 16
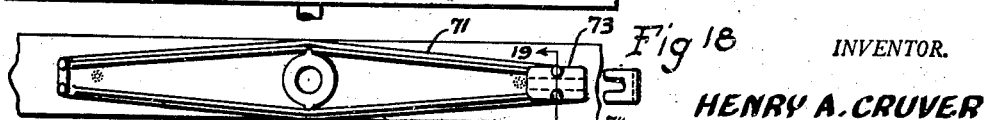
Fig. 17  Fig. 18  Fig. 19
INVENTOR.
HENRY A. CRUVER
BY T.V. Quarnstrom
ATTORNEY Feb. 26, 1946.     H. A. CRUVER     2,395,398
AMUSEMENT DEVICE
Filed Feb. 5, 1945     3 Sheets-Sheet 2

INVENTOR.
HENRY A. CRUVER
BY T. V. Quarnstrom
ATTORNEY

Feb. 26, 1946.     H. A. CRUVER     2,395,398
AMUSEMENT DEVICE
Filed Feb. 5, 1945     3 Sheets-Sheet 3

INVENTOR.
HENRY A. CRUVER
BY T. V. Quarnstrom
ATTORNEY

Patented Feb. 26, 1946

2,395,398

UNITED STATES PATENT OFFICE 2,395,398

AMUSEMENT DEVICE

Henry A. Cruver, Cleveland, Ohio

Application February 5, 1945, Serial No. 576,179

10 Claims. (Cl. 272—33)

This invention relates to an improved amusement device and in particular to a new type of merry-go-round which may be actuated by the occupants riding the device.

Such devices are usually provided with a horizontal radial beam or support having a plurality of seats for occupants rotatably mounted on a central base or post and having a pedal driven shaft simulating that of a bicycle. Friction wheels or toothed pinions are rigidly attached to the pedal shafts which are mounted so as to have traction with a stationary friction disc or gear rigidly supported on the base at the center of the merry-go-round. The revolution of the device is accomplished by the manual effort of the occupants of said seats.

Desirable features of a device of this kind are economy, simplicity, lightness, strength and ease of maintenance, and these features are generally obtained, within practical limitations, on merry-go-rounds now in use. However, merry-go-rounds are deficient in ease of operation under all conditions of loading. Practically all merry-go-rounds are provided with a traction member such as a stationary gear or friction disc rigidly mounted on a central base or post which provides the entire means for resiliently supporting the moving body of the merry-go-round.

It is known that traction members such as gears or friction discs that are rigidly mounted absorb little of the work of unbalanced forces applied thereto and as a result under certain conditions of uneven loading of the merry-go-round such as is caused by a difference in the weight of the occupants uneven traction of the pinions or friction rollers with the gear or friction disc will result. This causes the pinions or friction rollers driven by the lighter occupants to completely leave the gear or friction disc with the result that they will be turned to no useful work of either traction or braking effect. Consequently the entire load of revolving the merry-go-round will fall on the heavier occupants which generally results in damage to the merry-go-round and injury to the occupants.

It is, therefore, an object of my invention to minimize the uneven traction effect of the pinions or friction rollers on the stationary gear or friction disc resulting from any uneven loading of the merry-go-round.

Another object of my invention is to provide a merry-go-round having means for distributing the weight and forces other than direct centrifugal forces resulting from the revolving superstructure over all of the traction members.

A further object of my invention is to provide a merry-go-round having means for insuring effective traction between the traction members under all conditions of loading on the revolving superstructure.

A still further object of my invention is to provide a merry-go-round having easy and uniform riding qualities under all conditions of loading.

Other objects and a fuller understanding of my invention may be had by referring to the following description and claims, taken in conjunction with the accompanying drawings in which like parts are designated by like reference characters and in which:

Fig. 1 is a plan view of the device;

Fig. 2 is a side view of the device;

Fig. 15 is a side view of a modified device having a compensating yoke for the pedal shaft bearings;

Fig. 16 is a vertical sectional view of a compensating device;

Fig. 17 is a plan view of a modified form of compensating device shown in Fig. 16;

Fig. 18 is an end view of the compensating yoke shown in Fig. 17;

Fig. 19 is a cross-sectional view taken on line 19—19 of Fig. 17.

Figure 6:
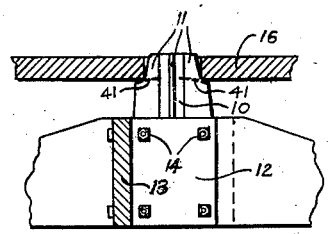
Fig. 6 is a vertical sectional view of a fragment of the friction disc or track mounting.
Figure 11:
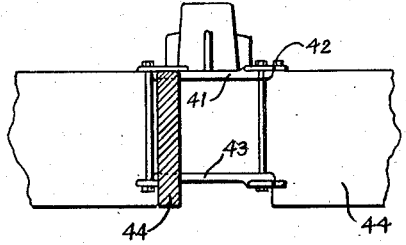
Fig. 11 is a side view of a modified base shown in Fig. 10.

As shown in the accompanying drawings my device consists of a base member 10 having ribs or extensions 11 and a square lower portion 12 and feet portions or supports 13 fastened thereto by means of bolts 14. If desired the members 10 and 13 may be formed in one homogenous piece but for reasons of economy and simplicity of manufacture I prefer to form them in sections fastened together as shown. In the base member 10 is secured vertical post or shaft 15 and on top of the base is mounted a circular disc 16 centered on said shaft and having a sheet metal track facing 17, Figures 2 and 7, secured thereto. The circular disc is provided with slots 18, Figure 7, that fit over the ribs 11, Fig. 6, to hold the disc in place. The central bore and slots of the track disc are made slightly larger than the portions of the base on which the disc is mounted whereby the disc has a loose fit on the base as shown in Fig. 6 so as to be semi-floating to help equalize the forces which are applied to the disc during the operation of the merry-go-round to be described.

Figure 3:
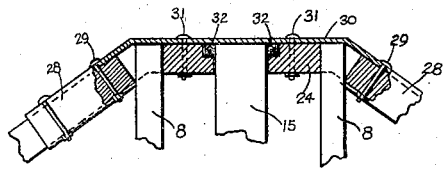
Fig. 3 is a detail sectional view of upper bearing and support for the main shaft and radial beam.
Figure 5:
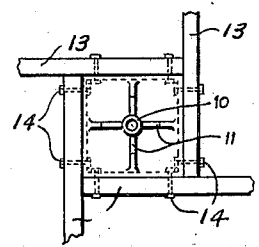
Fig. 5 is a plan view of the base casting.

On the shaft 15 is rotatingly mounted a frame 19, Fig. 2, having a horizontal radial beam 20 with a bore 21 having a turning fit on the shaft 15, vertical struts 22 retained at their lower ends in metal sockets 23 secured to the beam 20 and secured at their upper ends to a bearing block 24 by fastenings not shown, and brace bars 25 connected to the radial beam at their lower end by means of clips 26 and bolts 27 and at their upper ends to the bearing block 24 by means of metal strap 28 and bolts 29. Metal strap 28 is provided with a crown piece 30 which is secured to the bearing block by means of bolts 31. In the bearing block underneath the metal strap 28 a ball bearing 32 is secured centrally for the shaft 15, Fig. 3, to permit the frame and its radial beam to rotate easily and smoothly, a sufficient clearance being provided between the bearing block and the shaft 15 to permit the frame to freely rotate even when it may be slightly tilted out of its normal horizontal plane due to any uneven loading of the radial beam.

Secured to the ends of the radial beam 20 remote from the shaft or post 15 are seat members 33 which may be of any desirable form and may comprise a vertical horse shaped member 34 having seats 35 mounted thereon in which the occupants ride. On front legs provided on the horse shaped members are mounted bearings 36 in each of which one end of pedal rods 37 are journaled. Seat members 33 are preferably secured to radial beam 20 at an acute angle as viewed in Fig. 1 so the occupant will be positioned at substantially 90° or perpendicular to the longitudinal axis of the pedal rods 37. As a result during the operation of pedalling the merry-go-round the occupants will be riding in a line tangent to the circular path of the merry-go-round. Pedals or foot cranks 38 are provided on the pedal rods 37 on both sides of the pedal rod bearings 36, Fig. 1, conveniently arranged for the feet of the occupants to facilitate pedalling.

By means of these seat arrangements the manual motions of the occupants pedalling around the merry-go-round are exerted substantially forwardly in the direction in which the occupants are riding in the merry-go-round which thereby very closely simulates the manual movements and motions of bicycling.

The opposite ends of the pedal rods 37 are carried by bearings 39, Fig. 2, secured to the under side of the radial beam 20 and have friction rollers 40 rigidly secured to the ends thereof by any suitable means such as keys not shown. The friction rollers are adapted and positioned relative to the circular disc 16 so as to track with the sheet metal track facing at 17 at all times and the full weight of the rotating frame and the occupants carried thereby is transmitted through these friction rollers to the sheet metal track facing 17 on the circular disc 16. Due to the semi-floating arrangement of the circular disc 16 on the base 10 as already described this weight is uniformly distributed through all of the friction rollers to the fraction disc thereby preventing the concentration of stresses at any one point of the friction disc and consequent damage to the merry-go-round and injury to the occupants riding thereon. In other words, when due to an uneven loading of the occupants thereon the radial beam tends to revolve out of its normal horizontal plane the friction rollers 40 being mounted on the under side of the radial beam will also be forced out of their normal horizontal path of revolution about the central axis of the merry-go-round and the friction disc due to its semi-floating mounting on the base member 10 will follow the radial beam and the friction rollers and take a position substantially parallel to the radial beam thus enabling the friction rollers to track with the sheet metal track facing 17 on the friction disc. To further facilitate this coordination of movement of the respective members I may also make the bearing portion of the base 10 slightly convex as indicated at 41, Fig. 6, or if preferred and in addition I may provide a washer 53, Fig. 14, having one or both of its surfaces slightly convex between the friction disc 16 and the bearing portion 41 of the base 10.

Figure 4:
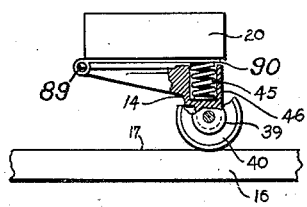
Fig. 4 is a detail view of the pedal-rod bearing mounting.

The bearing 39 for the pedal rod may also be hinged as indicated at 89, Fig. 4, to the plate 90 attached to the under side of the radial beam 20 and may be provided by a coil spring 45 mounted in coil spring cup 46 of the bearing acting against the radial beam to force the bearing and the friction roller 40 on the pedal shaft downwardly to keep the roller in engagement with the track regardless of the difference of weights on opposite ends of the beam.

In operation a rider sits in each seat 35, Fig. 2, and pedals to turn the rods 37. This rotates the rollers 40 and due to the fact that these rollers take all of the weight of the revolving superstructure including the weight of the riders, the rotation of the rollers causes the beam to travel in a circle about the shaft 15.

Figure 12:
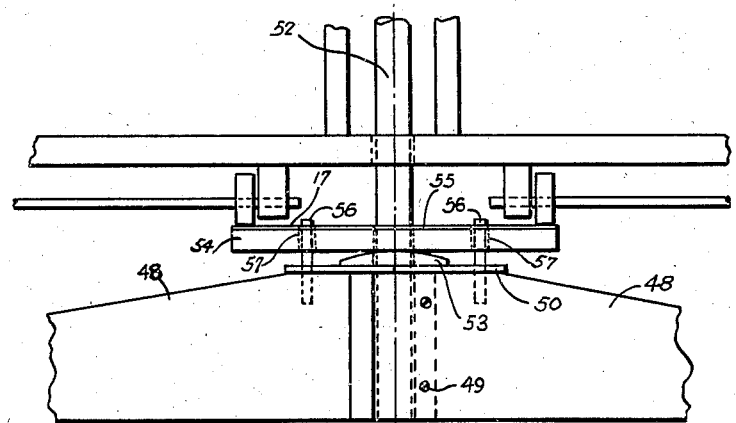
Fig. 12 is a vertical sectional view of a modified track mounting.
Figure 13:
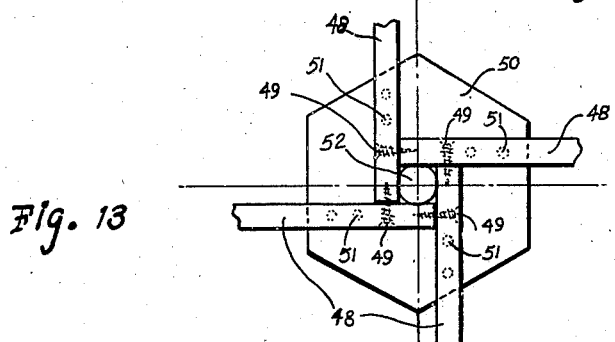
Fig. 13 is a bottom view of a portion of the base shown in Fig. 12.

Fig. 12 illustrates a modified form of base and traction disc mounting comprising base member 47 having feet portions 48 fastened together by means of screw bolts 49, Fig. 13, and having a top base plate 50 securely fastened to the members 48 by screw bolts 51.

Figure 8:
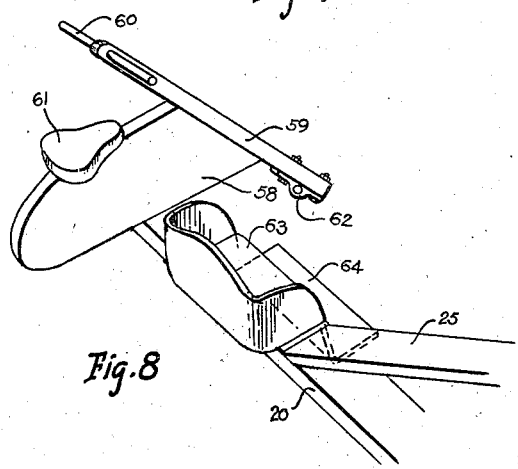
Fig. 8 is a perspective view of a seat construction of modified design.
Figure 10:
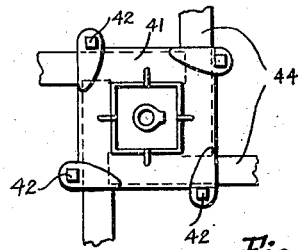
Fig. 10 is a plan view of a modified form of base.

In the base 47 may be secured a stationary post or shaft 52 which together with its attendant revolving parts are in all essentials the same as shown in Fig. 2 and therefore need no further description. On top of the base plate 50 I provide a washer 53 and a friction disc 54, Fig. 12, both centered on the shaft 52. The friction disc 54 is provided with a sheet metal track facing 55, Fig. 12, on which the friction rollers of the revolving superstructure will track as already described. The friction disc is non-rotatively mounted on the washer 53 on the base 47 by means of dowels 56, Fig. 12, rigidly secured in the base members 48 and passing up through holes 57 in the friction disc. The central bore and the dowel holes 57 in the friction disc are made slightly oversize so that the friction disc will be semi-floating and therefore free to tilt or move out of its normally horizontal position in correlation with similar movements of the revolving superstructure resulting from a difference in weights of the occupants riding in the seats. The washer 53 may have one or both of its surfaces convex so as to facilitate the semi-floating movement of the friction disc. Fig. 8 illustrates a modification of the seat arrangement which comprises vertical member 58 rigidly secured to the radial beam, post 59 with handle bars 60 and seat 61. At the base of post member 59 is mounted bearing 62 for one end of a pedal rod. Member 58, Fig. 8, is also mounted on the radial beam at an acute angle so the occupant will be positioned substantially perpendicular or 90° to the longitudinal axis of the pedal rod. In addition to seat 61 a second seat 63 is provided to permit four persons to ride instead of two. However, only two pedals are provided and the occupants of seats 63 rest their feet on rungs 64.

Figures 9, 14:
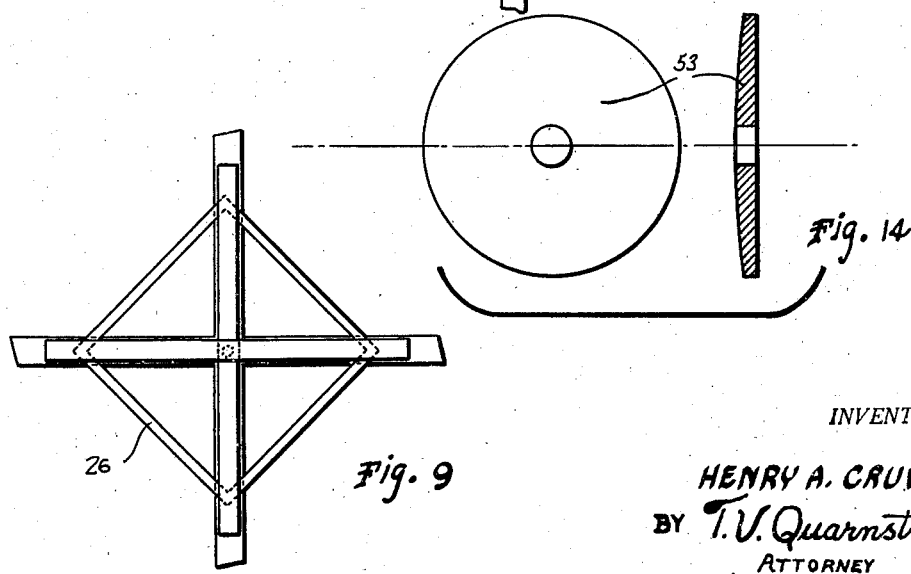
Fig. 9 is a plan view of a modified device having two radial beams.
Fig. 14 is a vertical sectional view of a modified form of track washer.

If desired two beams 20 may be used, secured at their centers at right angles to each other, as shown in Fig. 9, thereby providing for four pedalling operators, and thus the capacity of the device may be doubled.

Figure 7:
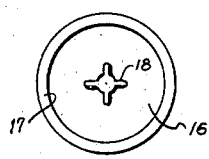
Fig. 7 is a plan view of the track.

Figures 15, 16 and 17 illustrate alternate means for carrying out the objects of the invention on a merry-go-round having a base similar to that shown in Fig. 12 and a revolving superstructure similar to that shown in Fig. 2 wherein instead of using a semi-floating type of friction disc the friction disc 66 is rigidly secured to a base 65 by means of screw bolts 67. This friction disc may have the same type of sheet metal track facing as shown in Fig. 7 and be adapted for engagement by friction rollers 68 rigidly secured to pedal shafts indicated fragmentally at 69 by keys or other conventional means. The pedal shafts are mounted in bearings 70 positioned adjacent the friction rollers for association with a bearing yoke 71 comprising an elongated body portion extending between the bearings 70 of oppositely disposed pedal shafts 69 and having end portions 72 bent down and forked to form lugs 73 arranged to straddle and rest in grooves 74 provided in the outer surface of the pedal shaft bearings 70. The bearing yoke is provided in its central portion with a bore 15 having a turning fit on the central shaft or post of the merry-go-round indicated at 16, Fig. 15, and a bearing pad 77 on which is mounted the radial beam of the revolving superstructure indicated at 79. The bearing yoke 71 is adapted to turn in a horizontal plane with the radial beam 79 as the latter is revolved in the operation of the merry-go-round, by means of stud pins 80 securely fastened to the radial beam 79 by screw threads 81 and nuts 82 and having the pin portions 80 extending down through oversize holes 83 provided adjacent the forked ends of the bearing yoke. The full weight and forces except the centrifugal force of the revolving superstructure including the radial beam 79 and the occupants are carried on the bearing portion 77 of the bearing yoke which are thereby transmitted through the friction rollers 68 to the stationary friction disc 66. However, as the radial beam turns in a plane out of its normal horizontal plane due to a difference in the weights of the occupants the bearing yoke continues to turn with the beam but in a normal horizontal plane as the pins 80 secured to the beam are free to slide vertically in the holes 83 provided in the body of the yoke 71. Thus all of the friction rollers 68 will have traction with the sheet metal track facing of the friction disc 66 under all conditions of loading of the radial beam so that all of the occupants will be able to exert a traction force on the friction disc to revolve the radial beam or to stop it by braking if desired regardless of any difference there may be in the weight of the occupants. Fig. 16 illustrates a bearing yoke construction wherein the stud pins 84 are rigidly secured in the yoke by means of threads 85 and nuts 86 and have the pin portions 84 extending up through oversize holes 87 provided therefor in the radial beam 88 which obviously will give the same effect as obtained by the construction shown in Fig. 15.

It will be understood that other means of supporting the friction disc 16 may be used and that numerous changes in the details of construction and the combination and arrangement of parts may be resorted to without departing from the spirit of the invention for example while the improved design has been described with particular reference to a friction type of drive it is conceivable that the same arrangement and construction of the parts are also applicable to other types of drives such as gear drives in which case the horizontally disposed traction element which might be a bevel or a spur gear or a worm wheel could be similarly mounted for a semi-floating or non-floating movement and thereby still have its teeth kept in mesh with the teeth of the revolving pinion or worm even though the radial beam might be forced out of a normally horizontal path of revolution about the central shaft 15 due to a difference in the weights of the occupants riding the device.

It is thought the foregoing description will fully and clearly set forth the construction and advantages to those skilled in the art to which such invention relates so that further detailed description will not be required.

Having described the invention, I claim:

1. In an amusement device comprising a base having a convex bearing surface, a post mounted on the base, a frame having a horizontal radial beam rotatably mounted on the post, a plurality of seats for occupants mounted on the radial beam remote from the said post, drive shafts operatively connected to the said frame and extending from the said seats toward the said post, driving elements rigidly attached to the said shafts adjacent the said post, and cranks associated with the said drive shafts adapted to be manually revolved by the occupants, the improvement comprising an annular driving element non-rotatively but semi-floatingly mounted on the convex bearing surface of the base concentrically of the post and extending to and for common association with the said first mentioned driving elements.

2. In an amusement device having a base, a post mounted on the base, a frame having a horizontal radial beam rotatably mounted on the post, a plurality of seats for occupants mounted on the radial beam remote from the said post, drive shafts operatively connected to the said frame and extending from the said seats toward the said post, driving elements rigidly attached to the said drive shafts adjacent the said post, and cranks associated with the said drive shafts adapted to be manually revolved by the occupants, the improvement comprising a washer having at least one of its surfaces convex mounted on the base, an annular driving element non-rotatively but semi-floatingly mounted on the said washer concentrically of the said post and extending to and for common association with the said first mentioned driving elements.

3. In an amusement device comprising a base having a convex bearing surface, a post mounted on the base, a frame having a horizontal radial beam rotatably mounted on the post, a plurality of seats for occupants mounted on the radial beam remote from the post, drive shafts operatively connected to the said frame and extending from the said seats toward the said post, driving elements rigidly attached to the said shafts adjacent the said post, and cranks associated with the said drive shafts adapted to be manually revolved by the occupants, the improvement comprising an annular driving element non-rotatively but semi-floatingly mounted on the convex bearing surface of the said base concentrically of the post and extending to and for common association with the said first mentioned driving elements, said annular driving element having holes therein, and dowels rigidly attached to the said base and extending freely through the said holes in the said annular driving element.

4. In an amusement device having a base, a post mounted on the base, a frame having a horizontal radial beam rotatably mounted on the post, a plurality of seats for occupants mounted on the radial beam remote from the said post, drive shafts operatively connected to the said frame and extending from the said seats toward the said post, driving elements rigidly attached to the said drive shafts adjacent the said post, and cranks associated with the said drive shafts adapted to be manually revolved by the occupants, the improvement comprising a washer having at least one of its surfaces convex mounted on the base, an annular driving element non-rotatively but semi-floatingly mounted on the said washer concentrically of the said post and extending to and for common association with the said first mentioned driving elements, said annular driving element having holes therein, and dowels rigidly attached to the said base and extending freely through the said holes on the said annular driving element.

5. In an amusement device comprising a base having a convex bearing surface, a post mounted on the base, a frame having a horizontal radial beam rotatably mounted on the post, a plurality of seats for occupants mounted on the radial beam remote from the said post, drive shafts operatively connected to the said frame and extending from the said seats toward the said post, inner and outer bearings for the said shafts mounted on the radial beam, driving elements rigidly attached to the said drive shafts adjacent the said post, and cranks associated with the said drive shafts adapted to be manually revolved by the said occupants, the improvement comprising flexible supports for the said inner bearings, and an annular driving element non-rotatively but semi-floatingly mounted on the convex bearing surface of the base concentrically of the post and extending to and for common association with the said first mentioned driving elements.

6. In an amusement device having a base, a post mounted on the base, a frame having a horizontal radial beam rotatably mounted on the post, a plurality of seats for occupants mounted on the radial beam remote from the said post, drive shafts operatively connected to the said frame and extending from the said seats toward the said post, inner and outer bearings for the said shafts mounted on the radial beam, driving elements rigidly attached to the said drive shafts adjacent the said post, and cranks associated with the said drive shafts adapted to be manually revolved by the said occupants, the improvement comprising flexible supports for the said inner bearings, a washer having at least one of its surfaces convex mounted on the base, and an annular driving element non-rotatively but semi-floatingly mounted on the said washer concentrically of the said post and extending to and for common association with the said first mentioned driving elements.

7. In an amusement device having a base, an annular driving element rigidly mounted on the base, a post mounted on the base and extending up through the said driving element, a frame having a horizontal radial beam rotatably mounted on the post, said radial beam having holes therein adjacent the post, a plurality of seats for occupants associated with the radial beam, drive shafts operatively connected to the said frame and extending from the said seats toward the said post, inner and outer bearings for the said drive shafts mounted on the radial beam, driving elements rigidly attached to the said drive shafts adjacent the said post for association with the said annular driving element, and cranks associated with the said drive shafts adapted to be manually revolved by the said occupants, the improvement comprising a bearing yoke rotatably mounted on the said post beneath the said radial beam, said yoke having a body portion, a central bore in the body portion, an annular bearing portion on the body portion concentric of the bore, radial arms extending outwardly from the body portion for association with the said inner bearings of the said drive shafts, and dowels rigidly attached to the yoke and extending freely through the said holes in the said radial beam.

8. In an amusement device having a base, an annular driving element rigidly mounted on the base, a post mounted on the base and extending up through the said annular driving element, a frame having a horizontal radial beam rotatably mounted on the post, a plurality of seats for occupants associated with the radial beam, drive shafts operatively connected to the said frame and extending from the said seats toward the said post, inner and outer bearings for the said drive shafts mounted on the radial beam, driving elements rigidly attached to the said drive shafts adjacent the said post for association with the said annular driving element, and cranks associated with the said drive shafts adapted to be manually revolved by the occupants, the improvement comprising a bearing yoke rotatably mounted on the said post beneath the radial beam, said yoke having a body portion, a central bore in the body portion, an annular bearing portion on the body portion concentric of the bore, and radial arms extending from the body portion for association with the said inner bearings of the said drive shafts, said bearing yoke having holes therein, said radial beam having dowels rigidly attached thereto and extending freely through the said holes in the said bearing yoke.

9. In an amusement device consisting of a base member, a post mounted on the base member, a frame having a horizontal radial beam member rotatively mounted on the post, a plurality of seats for occupants mounted on the radial beam member remote from the said post, drive shafts operatively connected to the said frame and extending from the said seats toward the said post, driving elements rigidly attached to the said shafts adjacent the said post, and cranks associated with the said drive shafts adapted to be manually revolved by the occupants, the improvement comprising means associated with one of the said members to permit the radial beam member to tilt relative to the base member and an annular driving element non-rotatively mounted between the said members concentrically of the post and extending to the said first mentioned driving elements and having common association therewith.

10. In an amusement device consisting of a base member, a post mounted on the base member, a frame having a horizontal radial beam member rotatively mounted on the post, a plurality of seats for occupants mounted on the radial beam member remote from the said post, drive shafts operatively connected to the said frame and extending from the said seats toward the said post, driving elements rigidly attached to the said shafts adjacent the said post, and cranks associated with the said drive shafts adapted to be manually revolved by the occupants, the improvement comprising means mounted on at least one of the said members having a convex bearing surface and an annular driving element non-rotatively but semi-floatingly mounted on the said means and between the said members concentrically of the post and extending to the said first mentioned driving elements and having common association therewith.

HENRY A. CRUVER.